United States Patent
White

(10) Patent No.: US 9,436,386 B2
(45) Date of Patent: Sep. 6, 2016

(54) SHARED REFERENCE COUNTERS AMONG A PLURALITY OF VIRTUAL STORAGE DEVICES

(71) Applicant: Scale Computing, Inc., Indianapolis, IN (US)

(72) Inventor: Philip Andrew White, San Francisco, CA (US)

(73) Assignee: Scale Computing, Inc., Indianapolis, IN (US)

( * ) Notice: Subject to any disclaimer, the term of this patent is extended or adjusted under 35 U.S.C. 154(b) by 140 days.

(21) Appl. No.: 14/318,414

(22) Filed: Jun. 27, 2014

(65) Prior Publication Data

US 2015/0378931 A1    Dec. 31, 2015

(51) Int. Cl.
*G06F 12/10*    (2016.01)
*G06F 3/06*    (2006.01)
*G06F 9/455*    (2006.01)
*G06F 9/46*    (2006.01)

(52) U.S. Cl.
CPC .................. *G06F 3/06* (2013.01); *G06F 9/455* (2013.01); *G06F 9/46* (2013.01); *G06F 3/064* (2013.01)

(58) Field of Classification Search
CPC .......... G06F 3/06; G06F 3/064; G06F 9/455; G06F 9/46
See application file for complete search history.

(56) References Cited

U.S. PATENT DOCUMENTS

2011/0225376 A1*  9/2011  Hasting ................. G06F 9/3851
                                                                                   711/154

* cited by examiner

*Primary Examiner* — Yong Choe
(74) *Attorney, Agent, or Firm* — Zilka-Kotab, PC

(57) ABSTRACT

A system, method, and computer program product are provided for implementing shared reference counters among a plurality of virtual storage devices. The method includes the steps of allocating a first portion of a real storage device to store data, wherein the first portion is divided into a plurality of blocks of memory and allocating a second portion of the real storage device to store a plurality of reference counters that correspond to the plurality of blocks of memory. The reference counters may be updated by two or more virtual storage devices hosted in one or more nodes to manage the allocation of the blocks of memory in the real storage device.

17 Claims, 9 Drawing Sheets

SHARED REFERENCE COUNTERS AMONG A PLURALITY OF VIRTUAL STORAGE DEVICES

FIELD OF THE INVENTION

The present invention relates to virtual machines, and more particularly to a technique for sharing reference counters among a plurality of virtual storage devices.

BACKGROUND

Reference counting refers to a technique for tracking a number of references (i.e., pointers or handles) to a particular resource of a computer system. For example, a portion of memory in system RAM (Random Access Memory) may be allocated to store an instantiation of an object associated with an application. A handle to that object is stored in a variable and a reference count for the object is set to one. The reference count indicates that there is one variable in memory that refers to the object via the handle. If the handle is copied into another variable, then the reference count may be incremented. If the variable storing the handle is overwritten, then the reference count may be decremented. Any resource having a reference count of zero can be safely reallocated because there is no longer any active reference that points to that resource.

Some systems may include a resource that is implemented as a block device. A block device includes a number of blocks of non-volatile memory. Hard disk drives, optical drives, and solid state drives are all examples of hardware devices that can be implemented as a block device. When an operating system allocates a block of the block device to a particular process or processes, the operating system also typically allocates space in system RAM to store reference counters associated with the block.

Some contemporary systems may implement a hypervisor on a node along with one or more virtual machines. Virtual machines are logical devices that emulate shared hardware resources connected to the node. In other words, two or more virtual machines may be implemented on the same node and configured to share common resources such as a processor, memory, or physical storage devices. The hypervisor may implement one or more virtual storage devices that emulate a real storage device for the virtual machines. The virtual storage device may contain a plurality of blocks of memory that are stored in one or more physical storage devices connected to the node. Contiguous blocks on the virtual storage device may refer to non-contiguous blocks on one or more physical storage devices. When reference counting is used in conjunction with the virtual storage devices, the reference counters associated with the virtual storage device may be stored in the RAM.

It will be appreciated that many systems that implement virtual machines include a plurality of nodes connected via a network, each node including one or more virtual machines. In such systems, multiple nodes may include virtual storage devices that can refer to the same blocks of data in the physical storage devices coupled to the nodes. It will be appreciated that implementing a garbage collection algorithm using reference counters in such systems may be difficult because one node may keep a reference counter for a block of a physical device that is also mapped to a block of another virtual storage device on another node. Thus, in order to ensure that a block of memory in the physical storage device is not prematurely overwritten, the nodes will need to implement a protocol for determining when blocks of the physical storage devices may be deallocated. Alternatively, a block of memory in the physical storage device can be restricted to only be mapped to a single virtual storage device, but such a restriction may make the system inefficient by requiring multiple redundant copies of a block of data when two or more virtual storage devices refer to the same block of data. Thus, there is a need for addressing this issue and/or other issues associated with the prior art.

SUMMARY

A system, method, and computer program product are provided for implementing shared reference counters among a plurality of virtual storage devices. The method includes the steps of allocating a first portion of a real storage device to store data, wherein the first portion is divided into a plurality of blocks of memory and allocating a second portion of the real storage device to store a plurality of reference counters that correspond to the plurality of blocks of memory. The reference counters may be updated by two or more virtual storage devices hosted in one or more nodes to manage the allocation of the blocks of memory in the real storage device.

DETAILED DESCRIPTION

A system may include a cluster of nodes, each node configured to host a plurality of virtual machines. The cluster of nodes is configured such that each node in the cluster of nodes includes a set of hardware resources such as a processor, a memory, a host operating system, one or more storage devices, and so forth. Each node may implement one or more virtual machines that execute a guest operating system configured to manage a set of virtual resources that emulate the hardware resources of the node. Each node also implements a block engine daemon process that is configured to allocate hardware resources for a set of virtual storage devices. The block engine daemon communicates with a set of client libraries implemented within the guest operating systems of the virtual machines. The block engine daemon also implements a real storage device abstraction layer as well as a virtual storage device abstraction layer. The real storage device abstraction layer includes a set of objects corresponding to the one or more physical storage devices included in the node as well as a set of objects corresponding to one or more additional storage devices included in other nodes of the cluster. The virtual storage device abstraction layer includes a set of objects corresponding to at least one logical storage device accessible by the virtual machines.

The block engine daemon is configured to track various parameters related to the storage devices within the cluster. For example, the block engine daemon maintains data that identifies a location for each of the storage devices connected to the cluster. The block engine daemon may also implement a protocol for allocating space in, reading data from, and writing data to the physical storage devices. The block engine daemon may also manage a set of reference counters associated with the real storage devices. The reference counters may be maintained in a portion of memory in the real storage devices rather than maintaining reference counters in the shared memory (i.e., RAM) allocated to the virtual machines implemented by the nodes. Consequently, multiple virtual storage devices can transparently share those reference counters without requiring the various nodes or virtual machines in the cluster to communicate each action related to the shared real storage devices to the other nodes or virtual machines.

Figure 1:
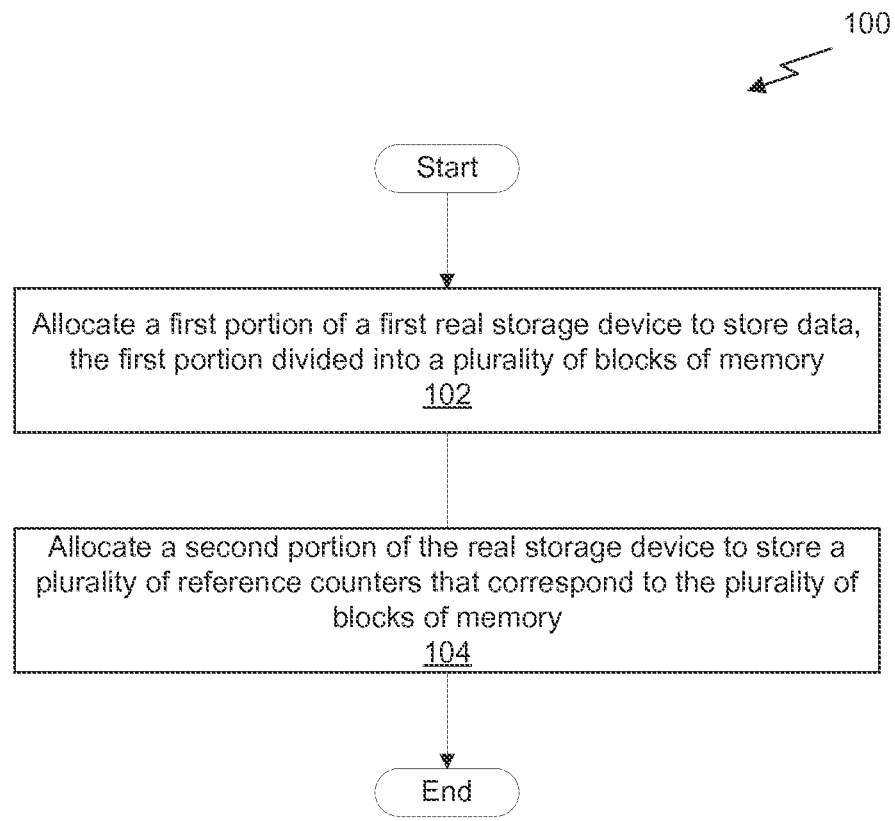
FIG. 1 illustrates a flowchart of a method for implementing shared reference counters associated with a plurality of virtual storage devices, according to one embodiment.

FIG. 1 illustrates a flowchart of a method 100 for implementing shared reference counters associated with a plurality of virtual storage devices, according to one embodiment. Although the method 100 is described in the context of a program executed by a processor, the method 100 may also be performed by custom circuitry or by a combination of custom circuitry and a program. At step 102, a first portion of a real storage device is allocated to store data. The real storage device is a block device and the first portion of the block device is divided into a plurality of blocks of memory. In the context of the following description, a real storage device is any physical device capable of storing data in blocks of memory. For example, real storage devices may include hard disk drives, optical disc drives, solid state drives, magnetic media, and the like. The real storage devices may be connected to a processor via any of the interfaces well-known in the art such as Serial Advance Technology Attachment (SATA), Small Computer System Interface (SCSI), and the like. In the context of the following description, a virtual storage device is a logical drive that emulates the real storage device. Virtual storage devices provide a logical interface for the virtual machines to access data in one address space that is mapped to a second address space on one or more real storage devices. Virtual storage devices may also implement redundant data storage, such as by storing multiple copies of data in different locations.

In one embodiment, a block engine server implements a level of abstraction that represents the real storage devices. The level of abstraction may represent each of the real storage devices with a real storage device object, which is an instantiation of a class that includes fields storing information related to the real storage device and methods for implementing operations associated with the real storage device. The methods may include operations for allocating a block of memory within the real storage device to store data, writing data to the real storage device, and reading data from the real storage device. The block engine server may also implement a level of abstraction that represents the virtual storage devices. The level of abstraction may represent the virtual storage device with a virtual storage device object, which is an instantiation of a class that includes fields storing information related to the virtual storage device and methods for implementing operations associated with the virtual storage device. For example, the fields may include a mapping table that associates each logical block of memory in the virtual storage device with a corresponding block of memory in the real storage device, a size of the virtual storage device, current performance statistics for the device, and so forth. The methods may include operations for allocating a block of memory within the virtual storage device to store data, writing data to the virtual storage device, and reading data from the virtual storage device.

At step 104, a second portion of the real storage device is allocated to store a plurality of reference counters that correspond to the plurality of blocks of memory in the first portion of the real storage device. As used herein, a reference counter is a number of bits (e.g., 16-bits) that stores a value associated with a particular block of memory. In one embodiment, when the value is equal to zero, the corresponding block of memory is available to be allocated for new data. When the value is greater than zero, the corresponding block of memory has been allocated to store data for at least one block of memory in at least one virtual storage device. The reference counters may be updated by two or more virtual machines hosted in one or more nodes to manage the allocation of the blocks of memory in the real storage device. It will be appreciated that a base value of zero represents a block of memory with no references associated with any virtual storage devices and that the value is incremented for each reference to the block that is created, but any base value may be used to indicate that the block of memory has no outstanding references and the value may be incremented or decremented when new references are created.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
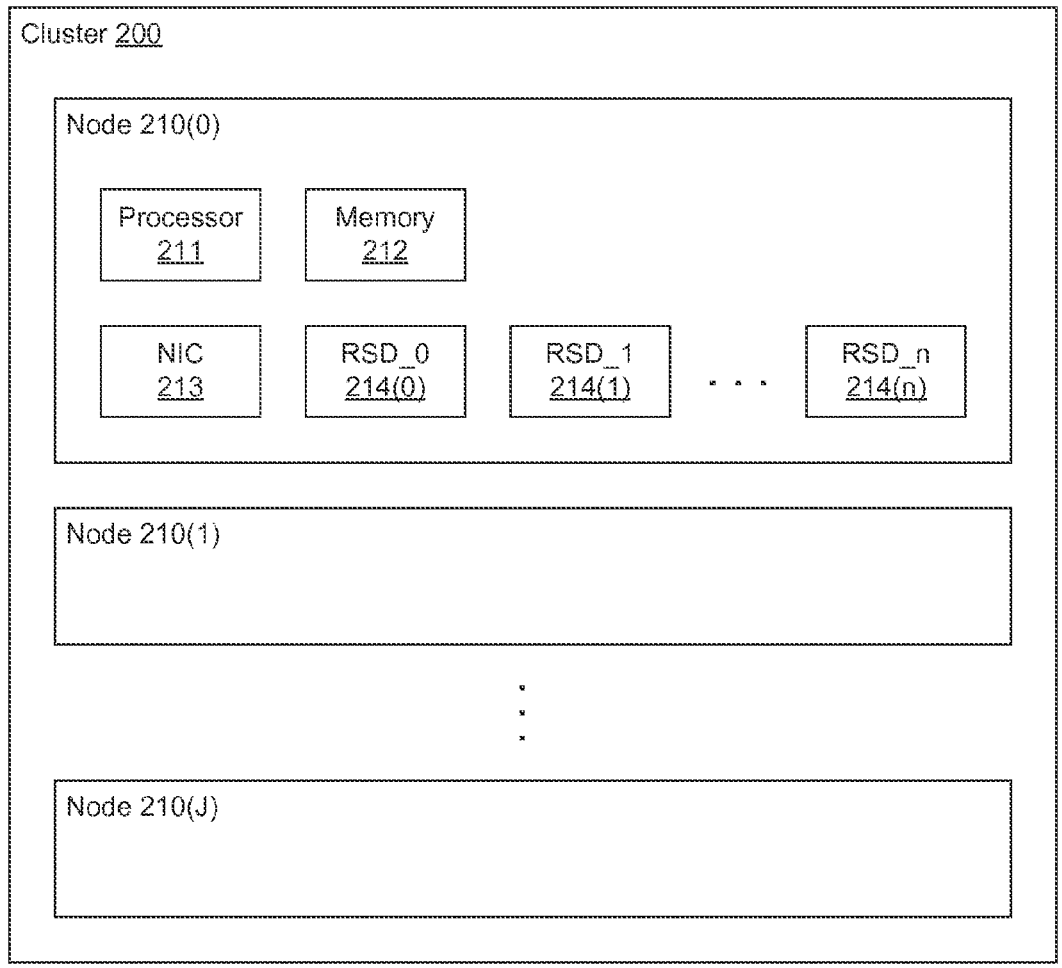
FIG. 2 illustrates a cluster having a plurality of nodes, in accordance with one embodiment.

FIG. 2 illustrates a cluster 200 having a plurality of nodes 210, in accordance with one embodiment. As shown in FIG. 2, the cluster 200 includes J nodes (i.e., node 210(0), node 210(1), . . . , node 210(J-1)). Each node 210 includes a processor 211, a memory 212, a NIC 213, and one or more real storage devices (RSD) 214. The processor 211 may be an x86-based processor, a RISC-based processor, or the like. The memory 212 may be a volatile memory such as a Synchronous Dynamic Random-Access Memory (SDRAM) or the like. The NIC 213 may implement a physical layer and media access control (MAC) protocol layer for a network interface. The physical layer may correspond to various physical network interfaces such as IEEE (Institute of Electrical and Electronics Engineers) 802.3 (Ethernet), IEEE 802.11 (WiFi), and the like. In one embodiment, the memory 212 includes a host operating system kernel, one or more device drivers, one or more applications, and the like. The host operating system kernel may be, e.g., based on the Linux® kernel such as the Red Hat® Enterprise Linux (RHEL) distribution. It will be appreciated that, although not explicitly shown, each node 210 may include one or more other devices such as GPUs, additional microprocessors, displays, radios, or the like.

As used herein an RSD 214 is a physical, non-volatile memory device such as a HDD, an optical disk drive, a solid state drive, a magnetic tape drive, and the like that is capable of storing data. The one or more RSDs 214 may be accessed via an asynchronous input/output functionality implemented by a standard library of the host operating system or accessed via a non-standard library that is loaded by the operating system, in lieu of or in addition to the standard library. In one embodiment, the host operating system may mount the RSDs 214 and enable block device drivers to access the RSDs 214 for read and write access.

The RSDs 214 may implement a file system including, but not limited to, the FAT32 (File Allocation Table—32-bit) file system, NTFS (New Technology File System), or the ext2 (extended file system 2). In one embodiment, each RSD 214 may implement logical block addressing (LBA). LBA is an abstraction layer that maps blocks of the disk (e.g., 512 B blocks of a hard disk) to a single unified address. The unified address may be 28-bit, 48-bit, or 64-bit wide that can be mapped, e.g., to a particular cylinder/head/sector tuple of a conventional HDD or other data storage space.

The memory 212 may also include a hypervisor that performs hardware virtualization. In one embodiment, QEMU (Quick EMUlator) is provided for emulating one or more VMs on each node of the cluster 200. In such embodiments, each node 210 may be configured to load a host operating system such as RHEL into the memory 212 on boot. Once the host operating system is running, the QEMU software is launched in order to instantiate one or more VMs on the node 210, each VM implementing a guest operating system that may or may not be the same as the host operating system. It will be appreciated that QEMU may generate VMs that can emulate a variety of different hardware architectures such as x86, PowerPC, SPARC, and the like.

Figure 3A:
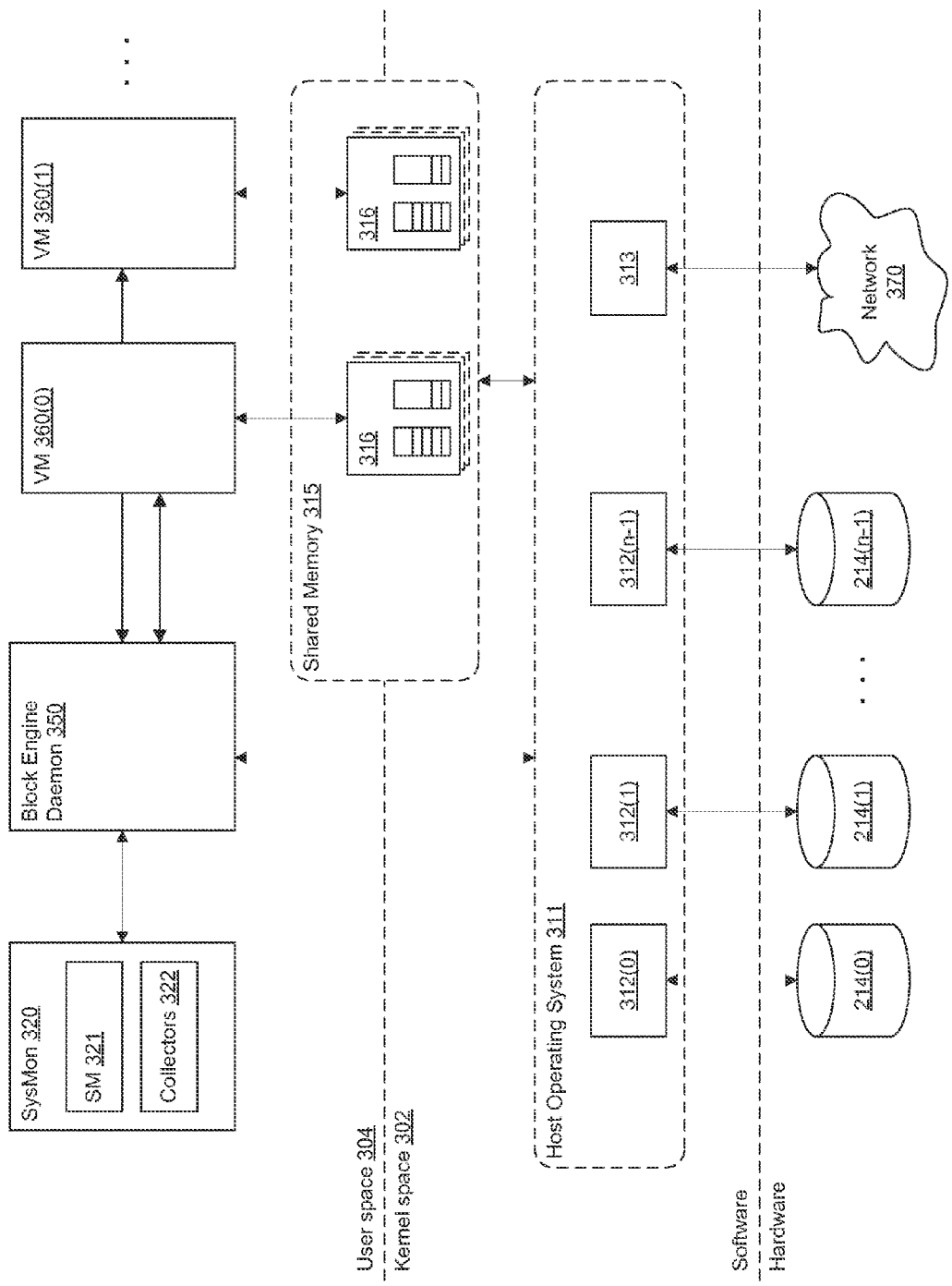
FIGS. 3A & 3B are conceptual diagrams of the architecture for a node of FIG. 2, in accordance with one embodiment.
Figure 3B:
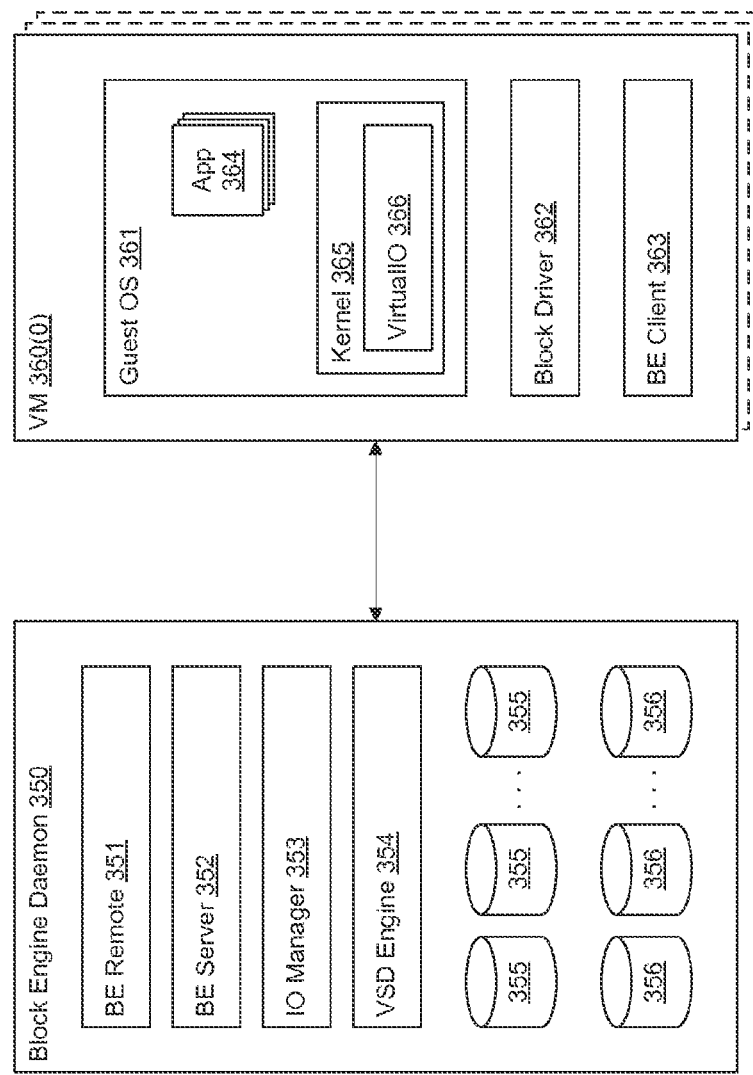

FIGS. 3A & 3B are conceptual diagrams of the architecture for a node 210 of FIG. 2, in accordance with one embodiment. As shown in FIG. 3A, the node 210 may execute a host operating system 311 that implements a protected mode of operation having at least two privilege levels including a kernel space 302 and a user space 304. For example, the host operating system 311 may comprise the Linux® kernel as well as one or more device drivers 312 and 313 that execute in the kernel space 302. The device drivers 312 enable applications in the user space 304 to read or write data from/to the RSDs 214 via a physical interface such as SATA (serial ATA), SCSI (Small Computer System Interface), FC (Fibre Channel), and the like. In one embodiment, the device drivers 312 are generic block device drivers included in the host operating system 311. The device driver 313 enables applications to communicate with other nodes 210 in the cluster 200 via a network interface, which may be wired (e.g., SONET/SDH, IEEE 802.3, etc.) or wireless (e.g., IEEE 802.11, etc.). In one embodiment, the device driver 313 is a generic network driver included in the host operating system 311.

The conceptual diagram in FIG. 3A shows the RSDs 214 and network 370 within the hardware abstraction layer. In other words, the RSDs 214 and network 370 comprise physical devices having a physical interface to the processor 211 in the node 210, either directly or indirectly through a system bus or bridge device. FIG. 3A also illustrates a software abstraction layer that includes objects and processes resident in the memory 212 of the node 210. The processes may be executed by the processor 211. For example, the host operating system 311, system monitor (SysMon) 320, Block Engine (BE) Daemon 350, and virtual machines (VMs) 360 are processes that are executed by the processor 211.

In one embodiment, the host operating system 311 may allocate a portion of the memory 212 as a shared memory 315 that is accessible by the one or more VMs 360. The VMs 360 may share data in the shared memory 315. The host operating system 311 may execute one or more processes configured to implement portions of the architecture for a node 210. For example, the host operating system 311 executes the BE Daemon 350 in the user space 304. The BE Daemon 350 is a background process that performs tasks related to the block devices coupled to the node 210 (i.e., the RSDs 214). The SysMon 320 implements a state machine (SM) 321 and a set of collectors 322 for managing the instantiation and execution of one or more VMs 360 that are executed in the user space 304. In addition, the SysMon 320 may be configured to manage the provisioning of virtual storage devices (VSDs). VSDs may be mounted to the VMs 360 to provide applications running on the VMs 360 access to the RSDs 214 even though the applications executed by the VMs 360 cannot access the RSDs 214 directly. In one embodiment, the SysMon 320 creates I/O buffers 316 in the shared memory 315 that enable the VMs 360 to read data from or write data to the VSDs mounted to the VM 360. Each VM 360 may be associated with multiple I/O buffers 316 in the shared memory 315. For example, each VSD mounted to the VM 360 may be associated with an input buffer and an output buffer, and multiple VSDs may be mounted to each VM 360.

As shown in FIG. 3B, each instance of the VM 360 implements a guest operating system 361, a block device driver 362, and a block engine client 363. The guest OS 361 may be the same as or different from the host operating system 311. The guest OS 361 comprises a kernel 365 that implements a virtual I/O driver 366 that is logically coupled to a VSD. Each VSD is a logical storage device that maps non-contiguous blocks of storage in one or more RSDs 214 to a contiguous, logical address space of the VSD. The VSD logically appears and operates like a real device coupled to a physical interface for the guest OS 361, but is actually an abstraction layer between the guest OS 361 and the physical storage blocks on the RSDs 214 coupled to the node 210, either directly or indirectly via the network 370. The guest OS 361 may execute one or more applications 364 that can read and write data to the VSD via the virtual I/O driver 366. In some embodiments, two or more VSDs may be associated with a single VM 360.

The block device driver 362 and the BE client 363 implement a logical interface between the guest OS 361 and the VSD. In one embodiment, the block device driver 362 receives read and write requests from the virtual I/O driver 366 of the guest OS 361. The block device driver 362 is configured to write data to and read data from the corresponding I/O buffers 316 in the shared memory 315. The BE client 363 is configured to communicate with the BE server 352 in the BE Daemon 350 to schedule I/O requests for the VSDs.

The BE Daemon 350 implements a Block Engine Remote Protocol 351, a Block Engine Server 352, an I/O Manager 353, and a VSD Engine 354. The Block Engine Remote Protocol 351 provides access to remote RSDs 214 coupled to other nodes 210 in the cluster 200 via the network 370. The BE Server 352 communicates with one or more BE Clients 363 included in the VMs 360. Again, the BE Client 363 generates I/O requests related to one or more VSDs for the BE Server 352, which then manages the execution of those requests via either the Block Engine Remote Protocol 351 (for RSDs 214 connected to other nodes 210 accessible via the network 370) or the I/O Manager 353 (for RSDs 214 connected to the node 210). The I/O Manager 353 enables the BE Daemon 350 to generate asynchronous I/O operations that are handled by the host OS 311 to read from or write data to the RSDs 214 connected to the node 210. Functions implemented by the I/O Manager 353 enable the BE Daemon 350 to schedule I/O requests for one or more VMs 360 in an efficient manner.

In one embodiment, the BE Daemon 350 also implements a VSD Engine 354. The VSD Engine 354 maintains state and metadata associated with a plurality of VSD objects 355. Each VSD object 355 may include a mapping table that associates each block of addresses (i.e., an address range) in the VSD with a corresponding block of addresses in one or more RSDs 214. The VSD objects 355 may include various state associated with a VSD such as a VSD identifier (i.e., handle), a base address of the VSD object 355 in the memory 212, a size of the VSD, a format of the VSD (e.g., filesystem, block size, etc.), and the like.

The VSD Engine 354 may also maintain state and metadata associated with a plurality of RSD objects 356. Each RSD object 356 may correspond to an RSD 214 connected to the node 210 or an RSD 214 accessible on another node 210 via the network 370. The RSD objects 356 may include various state associated with the RSDs 214 such as an RSD identifier (i.e., handle), a base address of the RSD object 356 in the memory 212, a size of the RSD 214, a format of the RSD 214 (e.g., filesystem, block size, etc.), and the like. The RSD object 214 may also track errors associated with the RSD 214.

The VSD objects 355 and the RSD objects 356 are abstraction layers implemented by the VSD Engine 354 that enable VMs 360, via the BE Daemon 350, to store data on the RSDs 214. In one embodiment, the VSD abstraction layer is a set of objects defined using an object-oriented programming (OOP) language. As used herein, an object is an instantiation of a class and comprises a data structure in memory that includes fields and pointers to methods implemented by the class. The VSD abstraction layer defines a VSD class that implements a common interface for all VSD objects that includes the following methods: Create; Open; Close; Read; Write; Flush; Discard; and a set of methods for creating a snapshot of the VSD. A snapshot is a data structure that stores the state of the VSD at a particular point in time. The Create method generates the metadata associated with a VSD and stores the metadata on an RSD 214, making the VSD available to all nodes 210 in the cluster 200. The Open method enables applications in the VMs 360 to access the VSD (i.e., the I/O buffers 316 are generated in the shared memory 315 and the VSD is mounted to the guest OS 361). The Close method prevents applications in the VMs 360 from accessing the VSD. The Read method enables the BE Server 352 to read data from the VSD. The Write method enables the BE Server 352 to write data to the VSD. The Flush method flushes all pending I/O requests associated with the VSD. The Discard method discards a particular portion of data stored in memory associated with the VSD.

In one embodiment, two types of VSD objects 355 inherit from the generic VSD class: a SimpleVSD object and a ReliableVSD object. The SimpleVSD object is a simple virtual storage device that maps each block of addresses in the VSD to a single, corresponding block of addresses in an RSD 214. In other words, each block of data in the SimpleVSD object is only stored in a single location. The SimpleVSD object provides a high performance virtual storage solution but lacks reliability. In contrast, the ReliableVSD object is a redundant storage device that maps each block of addresses in the VSD to two or more corresponding blocks in two or more RSDs 214. In other words, the ReliableVSD object provides n-way replicated data and metadata. The ReliableVSD object may also implement error checking with optional data and/or metadata checksums. In one embodiment, the ReliableVSD object may be configured to store up to 15 redundant copies (i.e., 16 total copies) of the data stored in the VSD. The SimpleVSD object may be used for non-important data while the ReliableVSD object attempts to store data in a manner that prevents a single point of failure (SPOF) as well as provide certain automatic recovery capabilities when one or more nodes experiences a failure. The VSD Engine 354 may manage multiple types of VSD objects 355 simultaneously such that some data may be stored on SimpleVSD type VSDs and other data may be stored on ReliableVSD type VSDs. It will be appreciated that the two types of VSDs described herein are only two possible examples of VSD objects inheriting from the VSD class and other types of VSD objects 355 are contemplated as being within the scope of the present disclosure.

The VSD Engine 354 may also implement an RSD abstraction layer that provides access to all of the RSDs 214 coupled to the one or more nodes 210 of the cluster 200. The RSD abstraction layer enables communications with both local and remote RSDs 214. As used herein, a local RSD is an RSD 214 included in a particular node 210 that is hosting the instance of the BE Daemon 350. In contrast, a remote RSD is an RSD 214 included in a node 210 that is not hosting the instance of the BE Daemon 350 and is accessible via a network 370. The RSD abstraction layer provides reliable communications as well as passing disk or media errors from both local and remote RSDs 214 to the BE Daemon 350.

In one embodiment, the RSD abstraction layer is a set of objects defined using an OOP language. The RSD abstraction layer defines an RSD class that implements a common interface for all RSD objects 356 that includes the following methods: Read; Write; Allocate; and UpdateRefCounts. Each RSD object 356 is associated with a single RSD 214. In one embodiment, the methods of the RSD class are controlled by a pair of state machines that may be triggered by either the reception of packets from remote nodes 210 on the network 370 or the expiration of timers (e.g., interrupts). The Read method enables BE Server 352 to read data from the RSD 214. The Write method enables BE Server 352 to write data to the RSD 214. The Allocate method allocates a block of memory in the RSD 214 for storing data. The UpdateRefCounts method updates the reference counts for each block of the RSD 214, enabling deallocation of blocks with reference counts of zero (i.e., garbage collection).

In one embodiment, two types of RSD objects 356 inherit from the RSD class: an RSDLocal object and an RSDRemote object. The RSDLocal object implements the interface defined by the RSD class for local RSDs 214, while the RSDRemote object implements the interface defined by the RSD class for remote RSDs 214. The main difference between the RSDLocal objects and the RSDRemote objects are that the I/O Manager 353 asynchronously handles all I/O between the BE Server 352 and local RSDs 214, while the BE Remote Protocol 351 handles all I/O between the BE Server 352 and remote RSDs 214.

As discussed above, the SysMon 320 is responsible for the provisioning and monitoring of VSDs. In one embodiment, the SysMon 320 includes logic for generating instances of the VSD objects 355 and the RSD objects 356 in the memory 212 based on various parameters. For example, the SysMon 320 may discover how many RSDs 214 are connected to the nodes 210 of the cluster 200 and create a different RSD object 356 for each RSD 214 discovered. The SysMon 320 may also include logic for determining how many VSD objects should be created and or shared by the VMs 360 implemented on the node 210. Once the SysMon 320 has generated the instances of the VSD objects 355 and the RSD objects 356 in the memory 212, the BE Daemon 350 is configured to manage the functions of the VSDs and the RSDs 214.

Figure 4:
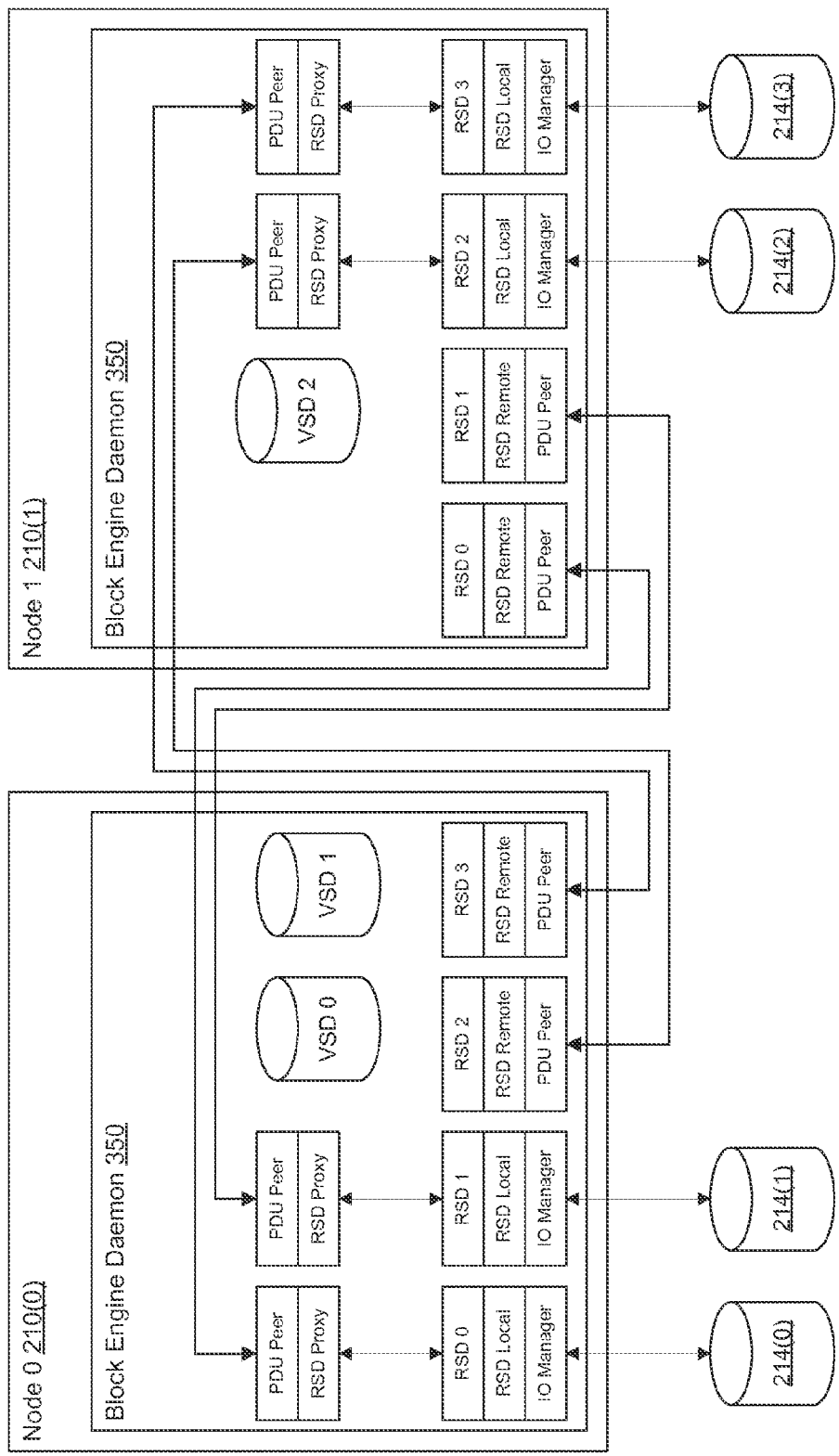
FIG. 4 illustrates the abstraction layers implemented by the block engine daemon for two nodes of the cluster, in accordance with one embodiment.

FIG. 4 is a conceptual diagram of the abstraction layers implemented by the BE Daemon 350 for two nodes 210 of the cluster 200, in accordance with one embodiment. A first node 210(0) is coupled to two local RSDs (i.e., 214(0) and 214(1)) and two remote RSDs (i.e., 214(2) and 214(3)) via the network 370. Similarly, a second node 210(1) is coupled to two local RSDs (i.e., 214(2) and 214(3)) and two remote RSDs (i.e., 214(0) and 214(1)) via the network 370. The RSD abstraction layer includes four RSD objects 356 (i.e., RSD 0, RSD 1, RSD 2, and RSD 3). In the first node 210(0), RSD 0 and RSD 1 are RSDLocal objects and RSD 2 and RSD 3 are RSDRemote objects.

The first node 210(0) accesses the first RSD 214(0) and the second RSD 214(1) via the I/O Manager library that makes system calls to the host operating system 311 in order to asynchronously read or write data to the local RSDs 214. An RSDLocal library is configured to provide an interface for applications communicating with the BE Daemon 350 to read or write to the local RSDs 214. The RSDLocal library may call methods defined by the interface implemented by the IOManager library. The first node 210(0) accesses the third RSD 214(2) and the fourth RSD 214(3) indirectly via a Protocol Data Unit Peer (PDUPeer) library that makes system calls to the host operating system 311 in order to communicate with other nodes 210 using the NIC 213. The PDUPeer library generates packets that include I/O requests for the remote RSDs (e.g., 214(2) and 214(3)). The packets may include information that specifies the type of request as well as data or a pointer to the data in the memory 212. For example, a packet may include data and a request to write the data to one of the remote RSDs 214. The request may include an address that specifies a block in the RSD 214 to write the data to and a size of the data. Alternately, a packet may include a request to read data from the remote RSD 214. The RSDProxy library unpacks requests from the packets received from the PDUPeer library and transmits the requests to the associated local RSD objects 356 as if the requests originated within the node 210.

The BE Remote Protocol 351, the BE Server 352, and the I/O Manager 353 implement various aspects of the RSD abstraction layer shown in FIG. 4. For example, the BE Remote Protocol 351 implements the RSDRremote library, RSDProxy library, and the PDUPeer library and the I/O Manager 353 implements the RSDLocal library and the IOManager library. The second node 210(1) is configured similarly to the first node 210(0) except that the RSD objects 356 RSD 0 and RSD 1 are RSDRemote objects linked to the first RSD 214(0) and the second RSD 214(1), respectively, and the RSD objects 356 RSD 2 and RSD 3 are RSDLocal objects linked to the third RSD 214(2) and the fourth RSD 214(3), respectively.

The VSD abstraction layer includes three VSD objects 355 (i.e., VSD 0, VSD 1, and VSD 2). In the first node 210(0), VSD 0 and VSD 1 are ReliableVSD objects. In the second node 210(1), VSD 2 is a ReliableVSD object. It will be appreciated that one or more of the VSD objects 355 may be instantiated as SimpleVSD objects, and that the particular types of objects chosen depends on the characteristics of the system. Again, the VSD objects 355 provide an interface to map I/O requests associated with the corresponding VSD to one or more corresponding I/O requests associated with one or more RSDs 214. The VSD objects 355, through the Read or Write methods, are configured to translate the I/O request received from the BE Server 352 and generate corresponding I/O requests for the RSD(s) 214 based on the mapping table included in the VSD object 355. The translated I/O request is transmitted to the corresponding RSD 214 via the Read or Write methods in the RSD object 356.

Figure 5A:
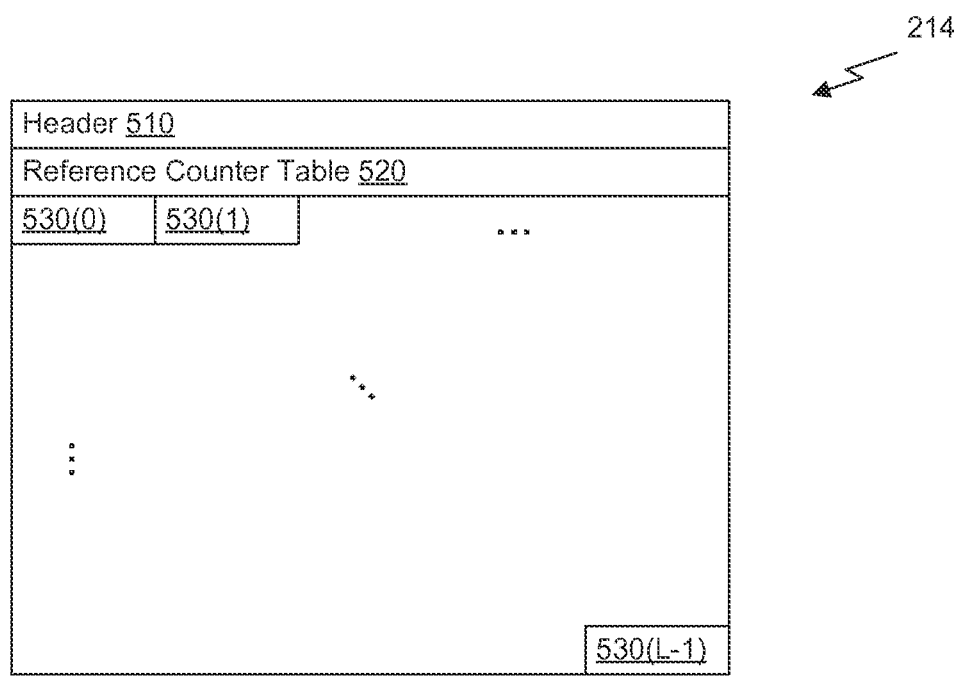
FIG. 5A illustrates the allocation of a real storage device, in accordance with one embodiment.

FIG. 5A illustrates the allocation of an RSD 214, in accordance with one embodiment. As shown in FIG. 5A, the RSD 214 includes a header 510, a reference counter table 520, and a plurality of blocks of memory 530(0), 530(1), . . . , and 530(L-1). The header 510 includes various information such as a unique identifier for the RSD 214, an identifier that indicates a type of file system implemented by the RSD 214, an indication of whether ECC checksums are implemented for data reliability, and the like. The reference counter table 520 is included in a first portion of the RSD 214 and includes a vector of reference counters, each reference counter in the vector being associated with a particular block of memory 530 included in a second portion of the RSD 214.

In one embodiment, each block of memory 530 is associated with a particular reference counter in the vector. A reference counter may be any number of bits representing an integer that is incremented each time a reference to the block of memory 530 is created and decremented each time a reference to the block of memory 530 is overwritten or destroyed. A reference refers to the mapping of a block of memory in a VSD to a block of memory in the RSD 214. In one embodiment, each reference counter may be 16-bits wide. If each memory address in the first portion of the RSD 214 refers to 64-bits of data, then a value stored in the memory identified by a particular address of the reference counter table 520 will include 4 reference counters associated with 4 blocks of memory 530 in the second portion of the RSD 214. In another embodiment, each block of memory 530 may be associated with two or more reference counters in the vector. For example, a block of memory 530 may comprise a number of sub-blocks, where each sub-block is associated with a separate and distinct reference counter in the reference counter table 520. For example, a block of memory 530 may comprise 4096 bytes whereas each reference counter is associated with a 512 byte sub-block. It will be appreciated that the sizes of blocks and sub-blocks given here are for illustrative purposes and that the sizes of blocks and sub-blocks in a particular RSD 214 may have other sizes. For example, each block may be 1 MB in size and reference counters may be associated with 4096 byte sectors of the drive. In such an embodiment, sub-blocks of the blocks of memory 530 may be allocated separately to separate VSDs.

In another embodiment, reference counters may be allocated dynamically as memory of variable size is allocated to store various objects. When the BE server 352 allocates one or more blocks of memory 530 in the RSD 214 for an object, the BE server 352 also assigns an available reference counter to that object. The reference counter may include both a counter (e.g., a 16-bit value) and an address that identifies the base address for the block(s) of memory 530 associated with the reference counter as well as a number of contiguous block(s) of memory 530 that are associated with that reference counter. In this manner, each reference counter does not refer to a fixed portion of the memory in the RSD 214 but instead refers to a particular contiguous allocation of memory in the RSD 214. It will be appreciated that the number of reference counters required to implement this system will vary and, therefore, this embodiment may be more complex to implement and may decrease the efficiency of memory access operations.

Figure 5B:
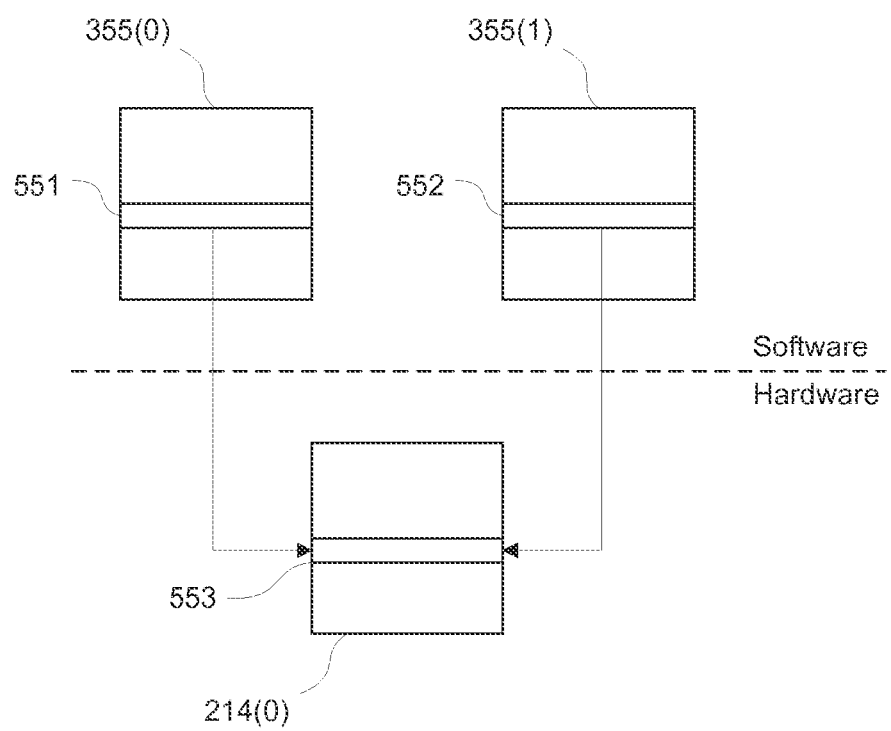
FIG. 5B is a conceptual illustration for the sharing of reference counters among a plurality of virtual storage devices, in accordance with one embodiment.

FIG. 5B is a conceptual illustration for the sharing of reference counters among a plurality of VSDs, in accordance with one embodiment. A node 210 may include an RSD 214 that is shared by two or more VSDs. The node 210 may implement one or more VMs 360 as well as a plurality of VSDs represented by a plurality of VSD objects 355. As shown in FIG. 5B, a first VSD object 355(0) and a second VSD object 355(1) are implemented as software constructs in the memory 315. It will be appreciated that the first VSD object 355(0) and the second VSD object 355(1) are stored in the memory 315, which is also a hardware device, but since the first VSD object 355(0) and the second VSD object 355(1) are virtual devices, they are shown on the software side of the hardware/software abstraction boundary. A virtual block of memory 551 in the first VSD object 355(0) is mapped to a corresponding block of memory 553 in the RSD 214(0). Similarly, a virtual block of memory 552 in the second VSD object 355(1) is mapped to the block of memory 553 in the RSD 214(0). In other words, the block of memory 553 in the RSD 214(0) is referenced by two different VSDs. The first VSD object 355(0) and the second VSD object 355(1) may be mounted in the same virtual machine 360 or different virtual machines 360 instantiated on the node 210. Similarly, the first VSD object 355(0) and the second VSD object 355(1) may be mounted in different virtual machines 360 instantiated on different nodes 210 connected via the network 370.

The RSD 214(0) includes at least one reference counter in the reference counter table 520 (not explicitly shown in FIG. 5B) of the RSD 214(0). As applications are executed by the VMs 360, references associated with the blocks of memory in the RSD 214(0) are created or destroyed based on the instructions of the applications. For example, an application executing in a first VM 360 may request the allocation of a block of memory 551 of the first VSD object 355(0) to store data for the application. The BE client 363 may request the BE server 352 to allocate the memory in the VSD. The BE server 352 then requests the allocation of a block of memory 553 in the RSD 214(0) in order to store the data and adds a pointer corresponding to the allocated block of memory 553 to the VSD object 355(0) that maps the block of memory in the VSD to the corresponding block of memory in the RSD 214(0). Allocating blocks of memory in this fashion creates the reference to the block of memory 553. Thus, the reference counter will be incremented to indicate that a first reference exists in the system and that the data in the block of memory 553 should not be reclaimed as part of a garbage collection routine. Similarly, an application executing in a second VM 360 may also request the allocation of a block of memory 552 of the second VSD object 355(1) to store a copy of the data associated with the block of memory 551. The BE server 352 may add a pointer corresponding to the block of memory 553 to the VSD object 355(1) that maps the block of memory in the VSD to the corresponding block of memory in the RSD 214(0). Allocating blocks of memory in this fashion creates a second reference to the block of memory 553. The reference counter is then incremented again to indicate that there are now two references to the block of memory 553 in the system.

Sharing reference counters among a plurality of VSDs is particularly useful when VSDs are copied from one node to another. For example, reference counters may be used when snapshots of VSDs are generated and/or when VSDs are cloned to another node. A snapshot may be created by copying the mapping table associated with a VSD in the RAM of that node or another node and incrementing each of the reference counters associated with that VSD. Reference counters may also be decremented when a snapshot is deleted. Similarly, a clone of the VSD may be created, either directly from the VSD or indirectly based on one or more snapshots of the VSD, and, when the clone is created, the reference counters may be incremented.

In one embodiment, complete VSDs, or rather the VSD objects 355 that represent the VSDs, may be copied in conjunction with a live migration operation where, for example, a virtual machine executing on one node is copied onto another node in order to balance the load among the plurality of nodes in the system. A copy of the VSD object 355 from the memory 315 may be transmitted from a first node to a second node and each of the reference counters corresponding to blocks of memory in the RSD(s) 214 that are mapped to blocks of memory in the VSD are incremented. Similarly, when a VSD object 355 is destroyed (e.g., because a virtual machine is terminated), the reference counters corresponding to blocks of memory in the RSD(s) 214 that are mapped to blocks of memory in the VSD are decremented.

A primary benefit to storing reference counters on the RSDs 214 is that copy-on-write operations may be triggered without the VSDs needing to actively manage the reference counters. For example, a write operation performed by a VSD on a first node that causes data to be written to an RSD on a second node can be handled entirely within the second node as a copy-on-write operation on the RSD, and a new RSD address may be returned to the first node in the write response. Such operation may eliminate one or more round-trips of message handshaking between nodes via the network in order to manage reference counters. Another benefit to storing reference counters in the RSDs 214 is that the VSDs that reference a particular block of memory in the RSD 214 may be located on different nodes of the system. A garbage collection routine executed by the host operating system would typically need to query each node in the system to determine whether any node had an active reference to that block of memory in the RSD 214 before marking that block of memory as available to be allocated to store new data. However, in the system described above, a garbage collection routine may simply access the reference counters in the RSDs 214 included in that node to determine whether any remote nodes have referenced a particular block of memory in the RSD 214.

Figure 6A:
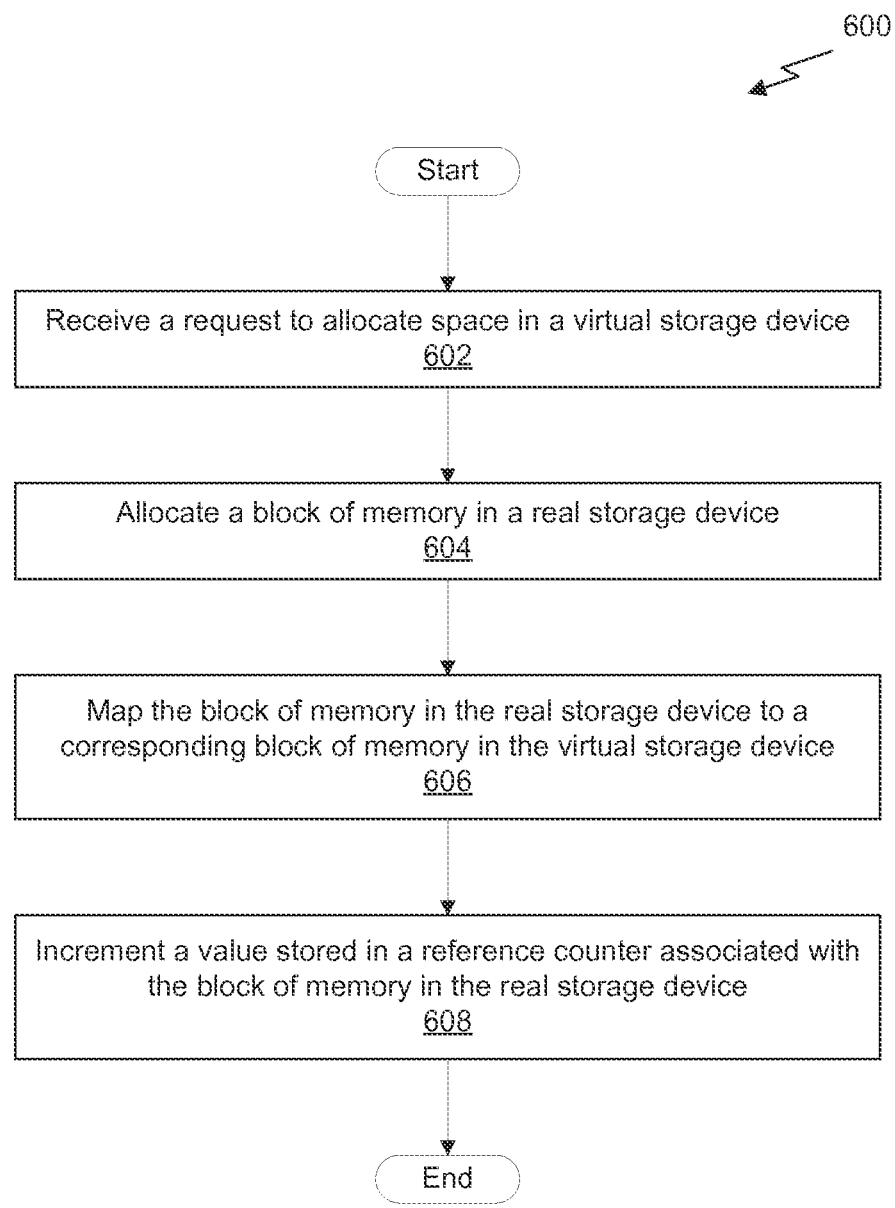
FIG. 6A illustrates a flowchart of a method for creating a new reference to a block of memory in a real storage device, in accordance with one embodiment.

FIG. 6A illustrates a flowchart of a method 600 for creating a new reference to a block of memory 530 in the RSD 214, in accordance with one embodiment. Although the method is described in the context of a program executed by a processor, the method may also be performed by custom circuitry or by a combination of custom circuitry and a program. It will be appreciated that the method 600 may be performed after the method 100 has been performed in order to configure the RSD 214 to include the reference counters and the plurality of blocks of memory 530. At step 602, a request to allocate space in a VSD to store data is received.

The request may be generated by the guest OS 361 and causes the BE client 363 to transmit a request to the BE server 352 to allocate space in at least one RSD 214 for the data. At step 604, the BE server 352 allocates a block of memory 530 in the RSD 214 for the data. At step 606, the block of memory 530 in the RSD 214 is mapped to a corresponding block of memory in the VSD. In one embodiment, the BE server 352 transmits a message to the BE client 363 that indicates the block of memory 530 in the RSD 214 has been allocated for the data, and the BE server 352 maps the block of memory 530 in the RSD 214 to a corresponding block of memory in the VSD by adding a corresponding pointer to the VSD object 355. At step 608, a value stored in a reference counter associated with the block of memory 530 in the RSD 214 is incremented. The incremented reference counter indicates that a new reference has been created for the block of memory 530 in the RSD 214.

In one embodiment, the BE server 352 may make a call to the Allocate method of the RSD object 356 in order to allocate the space and increment the reference counter. Once the space has been allocated, the BE server 352 may increment or decrement the reference counter associated with that block by making a call to the UpdateRefCounts method of the RSD object 356. For example, the UpdateRefCounts method may be used when a snapshot of the VSD is created to increment the reference counter or the UpdateRefCounts method may be used when a snapshot of a VSD is deleted to decrement the reference counter. Once the reference counter is decremented to zero (0), then the block of memory is considered free space and may be reallocated using the Allocate method of the RSD object 356.

It will be appreciated that the Write method of the RSD object 356 may cause free blocks in an RSD 214 to be allocated based on the current reference counter of the block being written. In one embodiment, the BE server 352 may make a call to the Write method of the RSD object 356. If the reference counter associated with the block identified by the write request is equal to one (1), then the data included in the write request will be written to the block of the RSD 214 and the reference counter may be incremented. However, if the reference counter associated with the block identified by the write request is greater than one (1) (i.e., 2 or more), then a new block in the RSD 214 may be transparently allocated to store a copy of the data included in the write request and an RSD address to the new block may be returned in a response to the write request. The Write method of the RSD object 356 may be configured in this manner because a reference count of two or greater indicates that multiple VSDs (or snapshots of VSDs, etc.) may reference the same block and, therefore, that block should not be modified in place. In other words, the RSD object 214 may be configured to allocate new blocks in the RSD(s) 214 to store copies of data based on the value of reference counters, and such reference counters need not be managed by the VSDs because the management of the reference counters is handled entirely within the RSD objects 356.

It will be appreciated that the method 600 may be repeated each time space in a VSD is allocated to store data or when a VSD is copied from one node to another node. In the case where the data is a copy of a block of memory in a different VSD, the reference counter for the block of memory 530 in the RSD 214 may simply be incremented and the mapping table for the different VSD may be updated. In the case where the data is new data, then a new block of memory 530 in the RSD 214 is allocated for the data.

Figure 6B:
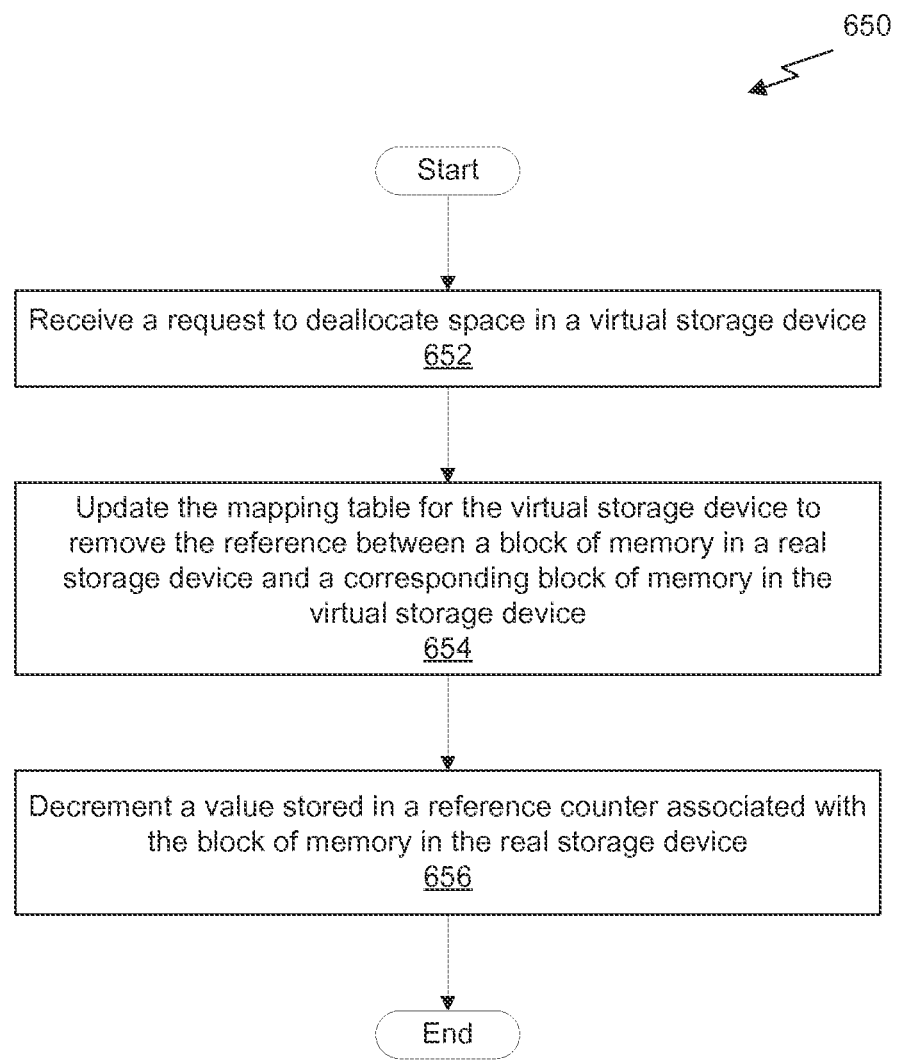
FIG. 6B illustrates a flowchart of a method for destroying a reference to a block of memory in a real storage device, in accordance with one embodiment.

FIG. 6B illustrates a flowchart of a method 650 for destroying a reference to a block of memory 530 in the RSD 214, in accordance with one embodiment. Although the method is described in the context of a program executed by a processor, the method may also be performed by custom circuitry or by a combination of custom circuitry and a program. At step 652, a request to deallocate space (e.g., a request to delete data) in a VSD is received. The request may be generated by the guest OS 361 and causes the BE client 363 to transmit a request to the BE server 352 to destroy the reference between the block of memory 530 in the RSD 214 and the corresponding block of memory in the VSD. At step 654, the BE server 352 updates a mapping table in the VSD object 355 to remove the reference between the block of memory 530 in the RSD 214 and a corresponding block of memory in the VSD. In one embodiment, the reference is removed by updating the mapping table such that a pointer associated with a base address in the VSD points to either a different block in that RSD 214 or a different RSD 214 or is replaced with a null pointer. At step 656, the BE server 352 causes a value stored in a reference counter associated with the block of memory 530 in the RSD 214 to be decremented. Again, in one embodiment, the BE server 352 may make a call to the UpdateRefCounts method of the RSD object 356 in order to decrement the reference counter.

Figure 7:
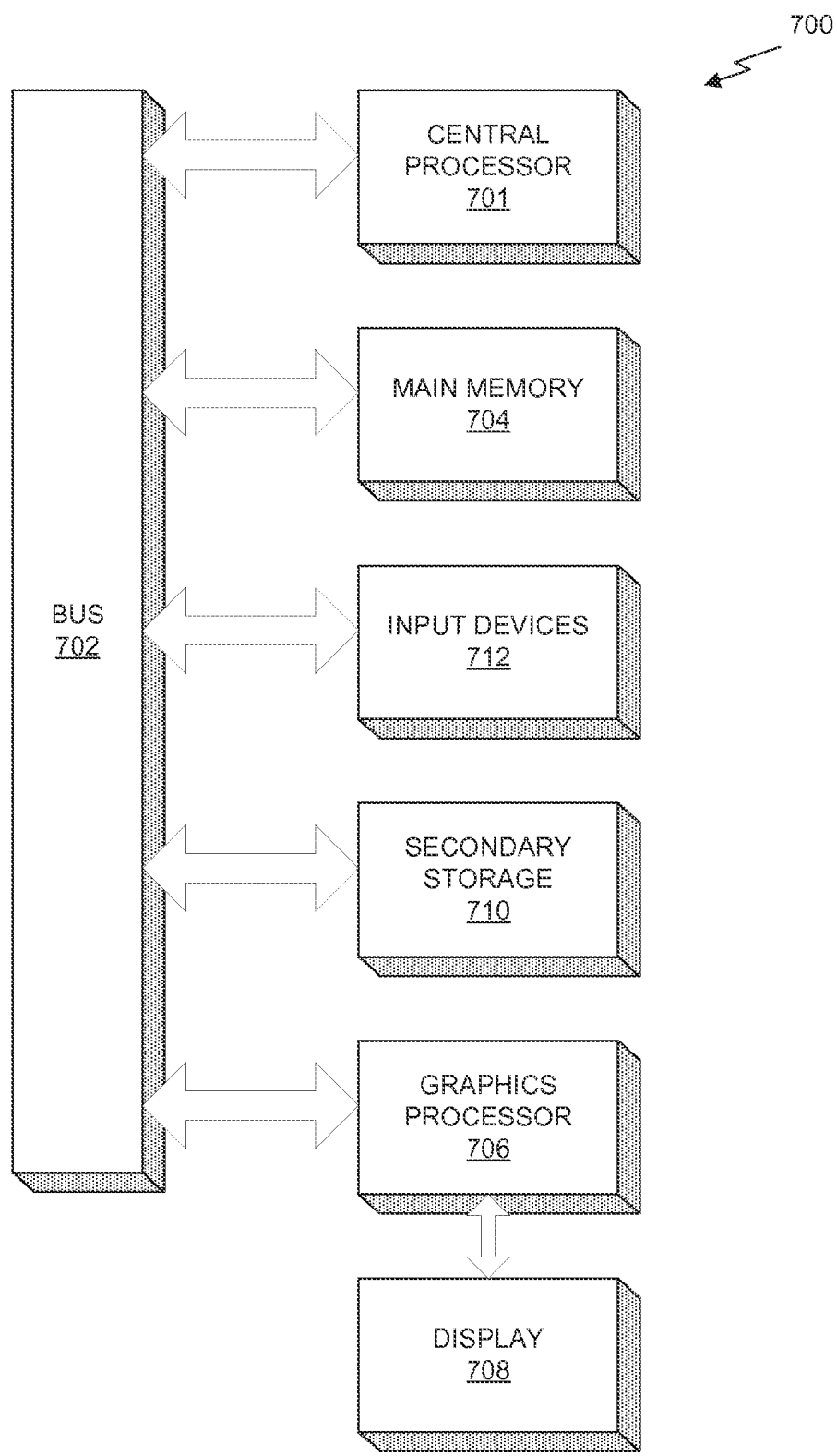
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. The system 700 may comprise a node 210 of the cluster 200. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   allocating a first portion of a real storage device (RSD) to store data, wherein the first portion is divided into a plurality of blocks of memory;
   allocating a second portion of the RSD to store a plurality of reference counters that correspond to the plurality of blocks of memory;
   mapping a block of memory in the RSD to a corresponding block of memory in a virtual storage device (VSD); and
   incrementing a value stored in a reference counter associated with the block of memory in the RSD.

2. The method of claim 1, wherein the RSD comprises a device selected from the group consisting of a hard disk drive, a solid state drive, a tape drive, and an optical disc drive.

3. The method of claim 1, wherein the VSD comprises a logical device represented by a data structure that includes a mapping table that associates blocks of memory in a first address space with the blocks of memory in the RSD.

4. The method of claim 3, further comprising:
   mapping the block of memory in the RSD to a corresponding block of memory in a second VSD; and
   incrementing the value stored in the reference counter.

5. The method of claim 4, further comprising:
   updating the mapping table for the VSD to remove the reference between the block of memory in the RSD and the corresponding block of memory in the VSD; and
   decrementing the value stored in the reference counter.

6. The method of claim 1, further comprising:
   receiving a request to allocate space in the RSD to store data;
   identifying at least one reference counter that stores a value equal to zero; and
   allocating a block of memory corresponding to the at least one reference counter to store the data.

7. The method of claim 1, wherein a value stored in a particular reference counter indicates a number of references associated with a block of memory in the RSD corresponding to the particular reference counter.

8. The method of claim 7, wherein the number of references corresponds to a number of distinct blocks of memory in one or more VSDs associated with the block of memory in the RSD corresponding to the particular reference counter.

9. The method of claim 1, further comprising:
   copying a virtual storage device (VSD) object from a first node to a second node; and
   incrementing each reference counter in the RSD associated with a block of memory in the RSD that is referenced by a mapping table in the VSD object.

10. The method of claim 1, further comprising:
    deleting a virtual storage device (VSD) object; and
    decrementing each reference counter in the RSD associated with a block of memory in the RSD that is referenced by a mapping table in the VSD object.

11. A non-transitory computer-readable storage medium storing instructions that, when executed by a processor, cause the processor to perform steps comprising:
    allocating a first portion of a real storage device (RSD) to store data, wherein the first portion is divided into a plurality of blocks of memory;
    allocating a second portion of the RSD to store a plurality of reference counters that correspond to the plurality of blocks of memory;
    mapping a block of memory in the RSD to a corresponding block of memory in a virtual storage device (VSD); and
    incrementing a value stored in a reference counter associated with the block of memory in the RSD.

12. The computer-readable storage medium of claim 11, the steps further comprising:
    mapping the block of memory in the RSD to a corresponding block of memory in a second VSD; and
    incrementing the value stored in the reference counter.

13. The computer-readable storage medium of claim 12, the steps further comprising:
    updating the mapping table for the VSD to remove the reference between the block of memory in the RSD and the corresponding block of memory in the VSD; and
    decrementing the value stored in the reference counter.

14. The computer-readable storage medium of claim 11, the steps further comprising:
    receiving a request to allocate space in the RSD to store data;
    identifying at least one reference counter that stores a value equal to zero; and
    allocating a block of memory corresponding to the at least one reference counter to store the data.

15. A system comprising:
a real storage device (RSD); and
a processor coupled to the RSD and configured to:
- allocate a first portion of the RSD to store data, wherein the first portion is divided into a plurality of blocks of memory;
- allocate a second portion of the RSD to store a plurality of reference counters that correspond to the plurality of blocks of memory;
- map a block of memory in the RSD to a corresponding block of memory in a virtual storage device (VSD); and
- increment a value stored in a reference counter associated with the block of memory in the RSD.

16. The system of claim 15, wherein the RSD and the processor are included in a first node, the system further comprising a second node including a second RSD and a second processor configured to:
- allocate a first portion of the second RSD to store data, wherein the first portion of the second RSD is divided into a plurality of blocks of memory; and
- allocate a second portion of the second RSD to store a plurality of reference counters that correspond to the plurality of blocks of memory of the second RSD.

17. The system of claim 16, the processor further configured to:
- copy a virtual storage device (VSD) object from the first node to the second node;
- incrementing each reference counter in the first RSD associated with a block of memory in the first RSD that is referenced by a mapping table in the VSD object; and
- incrementing each reference counter in the second RSD associated with a block of memory in the second RSD that is referenced by the mapping table in the VSD object.

* * * * *